Figure 1:
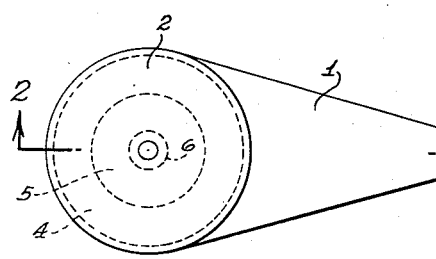

Dec. 29, 1936.   E. H. PIRON   2,066,187
SPRING DEVICE
Filed Sept. 21, 1933

INVENTOR.
Emil H. Piron
BY
Windsor Davis
ATTORNEY.

UNITED STATES PATENT OFFICE 2,066,187

SPRING DEVICE

Emil H. Piron, Highland Park, Mich., assignor, by mesne assignments, to Transit Research Corporation, New York, N. Y., a corporation of New York Application September 21, 1933, Serial No. 690,472

3 Claims. (Cl. 267—21)

This invention relates to cushioning devices wherein a resilient material is subjected to loading either in compression or torsional shear and has for its object to provide an improved construction for the cushioning element by which more nearly uniform loading may be imposed thereon with the result that longer life may be expected from an element of reduced size.

In the construction, for instance, of rubber springs in which torsion is imposed on rubber resistance elements, that part of the rubber farthest from the axis of rotation is submitted to greater stresses than other parts nearer the axis of rotation. In fact, the stresses increase proportionally to the distance from the axis of rotation as long as the modulus of elasticity and thickness of the rubber is uniform. This is also true of compression springs of certain types, as will be hereinafter more fully explained.

If the rubber is distorted by torsion or compression, as in the illustrations, so that its extreme fibre or the fibre farthest from the axis of rotation is submitted to a maximum safe stress, the other fibres of the rubber nearer to the axis of rotation are submitted to smaller stresses and the rubber may be said not to be working to capacity. On the other hand, once the angle of rotation is chosen so as to produce in the extreme fibre the maximum safe stress with a rubber of given thickness and modulus of elasticity, it becomes evident that it is possible by increasing the modulus of elasticity as the center is approached to increase the stress corresponding to the given angular deflection so as to keep it equal to the stress of the extreme fibre, or nearly so, thus making the rubber work at or near capacity throughout the area of the rubber.

It is therefore the object of this invention to provide a torque resisting element whose characteristics of resistance will vary according to its distance from an intended axis of rotation in order to obtain substantially uniform stresses throughout the whole element. Rubber lends itself readily to such a gradation because the modulus of elasticity of rubber may be altered at will by altering its composition, so that a composite block may be made in which a soft rubber at the outer edges will gradate into a harder rubber near the axis of rotation. Such a block can be computed by which a substantially uniform stress throughout may be obtained and hence the torque which may be resisted thereby increased, or, conversely, a block of reduced size may be employed to resist the same torque.

It is a further object of the invention to teach how the principle revealed herein may also be applied in actual practice to loosely approach the above described ideal of complete uniformity in the distribution of stress in such manner as to prove satisfactory for many installations.

Figure 2:
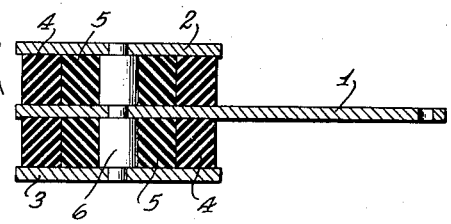
Figure 3:
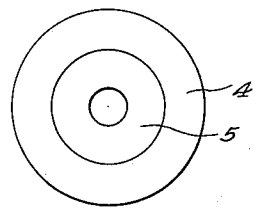
Figure 4:
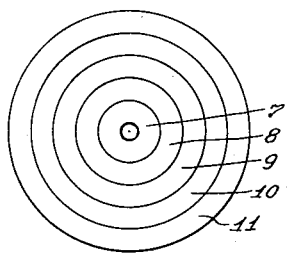

Other objects and advantages will become hereinafter more fully apparent as reference is had to the accompanying drawing, wherein my invention is illustrated, by way of example and not in a limiting sense, and in which Figure 1 is a side elevation of my improved spring device, Figure 2 is a horizontal transverse section taken along the line 2—2 of Figure 1, Figure 3 is a side elevation of the springing elements, and Figure 4 is a side elevation of a modification of the springing elements of Figure 3.

More particularly, an arm 1 is separated from two plate members 2 and 3 by elastic elements 4 and 5. Rotation of the arm 1 with respect to the plates 2 and 3 about their common axis 6 imposes a torsional shear on the elastic elements.

It is recommended that the plate members be so mounted in the assembly in which they are to function as to impose a substantial and continuous pressure upon the elements normal to the direction of relative movement of the plate members of sufficient magnitude to set up a frictional lock against slippage of the elements relative to the plate members under normal operation, as I have found this to be more satisfactory under heavy shear loads than to rely upon a rubber to metal vulcanization.

For the purpose of increasing the life of the elements they are formed so that substantially uniform loading may be imposed thereon. More particularly, they are formed so that their resistance to deformation offered per unit area in shear decreases with the distance from the intended axis of polar rotation in such manner that they will be subjected throughout to substantially uniform stresses. This is secured by increasing the hardness and, as a result, the modulus of elasticity of the elements as their centers are approached. The elements 4 and 5 are so constructed, their regions near the axis being harder than those remote from the axis.

Another advantage secured by this construction is that the cushioning or spring device may be reduced in size, since the entire mass of the elements herein revealed may be depended upon to work to capacity. This is manifestly impossible for elements having uniform modulus of elasticity throughout.

In the embodiment illustrated in Figure 4 each elastic element is composed of a nest of individual annular rubber rings 7, 8, 9, 10, and 11 arranged concentrically. Each of these rings has a different modulus of elasticity with each ring having a modulus of elasticity greater than that of the immediately encircling ring. With this construction a closer approach to the ideal stress distribution, according to the number of rings used, is secured. By further increasing the number of rings, a still further approach to ideal stress distribution can be secured.

What I claim as my invention is:

1. A composite cushioning element adapted for subjection to torsional shear comprising a nest of separate sections arranged concentrically about an intended axis of rotation, each of said sections having a greater modulus of elasticity than the adjacent section as said axis is approached.

2. In a spring device, a plurality of rigid plate members, rubber resistance elements composed of a nest of rings separating each pair of said plate members, said members being relatively rotatable about an axis to impose torsional shear on said elements, said rings having a modulus of elasticity which becomes greater with each succeeding ring as said axis is approached whereby all stresses are distributed substantially uniformly throughout said rubber.

3. In a spring device, opposed parallel metallic members, a plurality of separate concentric rubber rings each of a different degree of hardness separating said members, said rings each being of uniform hardness with each ring of greater hardness than the rings therearound.

EMIL H. PIRON.